United States Patent
Minarik et al.

[15] 3,678,360
[45] July 18, 1972

[54] MOTOR SPEED CONTROL WITH TRANSFORMER FEEDBACK MEANS

[72] Inventors: William J. Minarik, Los Angeles; Raymond J. Mason, Lynwood, both of Calif.

[73] Assignee: Minarik Electric Company, Los Angeles, Calif.

[22] Filed: Feb. 2, 1970

[21] Appl. No.: 7,740

[52] U.S. Cl. .................................................318/332, 318/345
[51] Int. Cl. .........................................................H02p 5/16
[58] Field of Search ...................................318/345, 332, 331

[56] References Cited

UNITED STATES PATENTS

| | | |
|---|---|---|
| 3,582,745 | 6/1971 | Eguchi...................................318/331 |
| 3,242,410 | 3/1966 | Cockrell................................318/345 |
| 3,450,941 | 6/1969 | Butts.....................................318/345 |
| 3,539,892 | 11/1970 | Lindberg..............................318/345 |
| 3,284,688 | 11/1966 | Black....................................318/345 |
| 3,336,517 | 8/1967 | Cain......................................318/345 |
| 3,403,314 | 9/1968 | Maynard...............................318/345 |
| 3,443,189 | 5/1969 | Gilbreath.............................318/345 |
| 3,473,101 | 10/1969 | Muskovac............................318/345 |
| 3,477,003 | 11/1969 | Kato.....................................318/345 |
| 3,508,134 | 4/1970 | Dosch...................................318/345 |
| 3,513,373 | 5/1970 | Kato.....................................318/345 |

*Primary Examiner*—Bernard A. Gilheany
*Assistant Examiner*—Thomas Langer
*Attorney*—Beehler and Arant

[57] ABSTRACT

A power supply circuit including a Triac for controlling the initiation of current flow to the load during each half-cycle. Firing of the Triac is directly controlled by a diac, and during each half-cycle the firing of the diac is controlled by a timing capacitor which is charged first in one direction and then in the other by current flowing from the alternating current source.

In one form of the circuit the exact firing point of the diac (and hence of the Triac) is also influenced by a feedback transformer which derives a regenerative feedback voltage from the current flowing through the Triac, and which operates when the Triac current increases to advance the point at which the Triac fires.

In another form of the circuit a regenerative feedback voltage is achieved without the use of a transformer, using Zener diodes for line voltage regulation and a number of resistors and capacitors suitably connected in the circuit.

The circuits are illustrated as supplying current to an electric motor, which requires an increase in operating voltage in order to maintain the motor speed constant when the mechanical load on the motor increases.

The purpose of the above abstract is to provide a non-legal technical statement of the disclosure of the contents of the instant patent application and thus serve as a searching-scanning tool for scientists, engineers and researchers. Accordingly, this abstract is not intended to be used in understanding or otherwise comprehending the principles of the present invention hereinafter described in detail, nor is it intended to be used in interpreting or in any way limiting the scope or fair meaning of the claims appended hereto.

17 Claims, 4 Drawing Figures

INVENTORS
WILLIAM J. MINARIK
RAYMOND J. MASON
BY
Beehler & Arant
ATTORNEYS

INVENTORS
WILLIAM J. MINARIK
RAYMOND J. MASON
BY
Beehler & Arant
ATTORNEYS

MOTOR SPEED CONTROL WITH TRANSFORMER FEEDBACK MEANS

BACKGROUND OF THE INVENTION

During the past several years it has become well known to utilize a Triac for controlling a power supply circuit which operates on full-wave alternating current, with the firing of the Triac during each half of the cycle being controlled by a diac. The breakdown of the diac is, in turn, accomplished by the charge stored on a timing capacitor which is part of an R-C circuit coupled generally in parallel with the Triac. In that well-known basic circuit the firing of the diac, and hence of the Triac, is controlled in response to a control signal developed as a function of either the line voltage or the voltage appearing across the Triac.

According to the present invention Triac circuits are applied to the problem of motor speed control. There are many applications of electric motors where the mechanical load on the motor may vary but it is desirable to maintain the motor speed constant. Such an electric motor may, for example, be a direct-current motor of either the permanent magnet or wound field type, or an alternating-current motor of either the shaded pole or repulsion type. If voltage is simply maintained as the motor load increases the result is a drop in motor speed, and in order to maintain the speed constant it is necessary to actually increase the voltage supplied to the motor.

According to the present invention a control signal is developed as a function of the voltage appearing across the supply line or across the Triac, by utilizing an R-C circuit which is charged first in one direction and then in the other, and this control signal is stored on the timing capacitor and applied to the diac in essentially the same manner as heretofore known. There is also additional circuitry which develops a regenerative feedback signal, which is combined with the traditional control signal so that the precise point of time in each half-cycle when the Triac fires is determined as a composite function of the two signals. A more precise control of the motor speed, as mechanical load on the motor changes, is therefore achieved.

Thus, the main object and purpose of the present invention is to provide novel Triac circuits which may be advantageously used as motor speed controls.

Another object of the invention is to provide novel Triac circuits for voltage control, which may be used for any desired application with any desired type of load.

DRAWING SUMMARY

DETAILED DESCRIPTION

Figure 1:
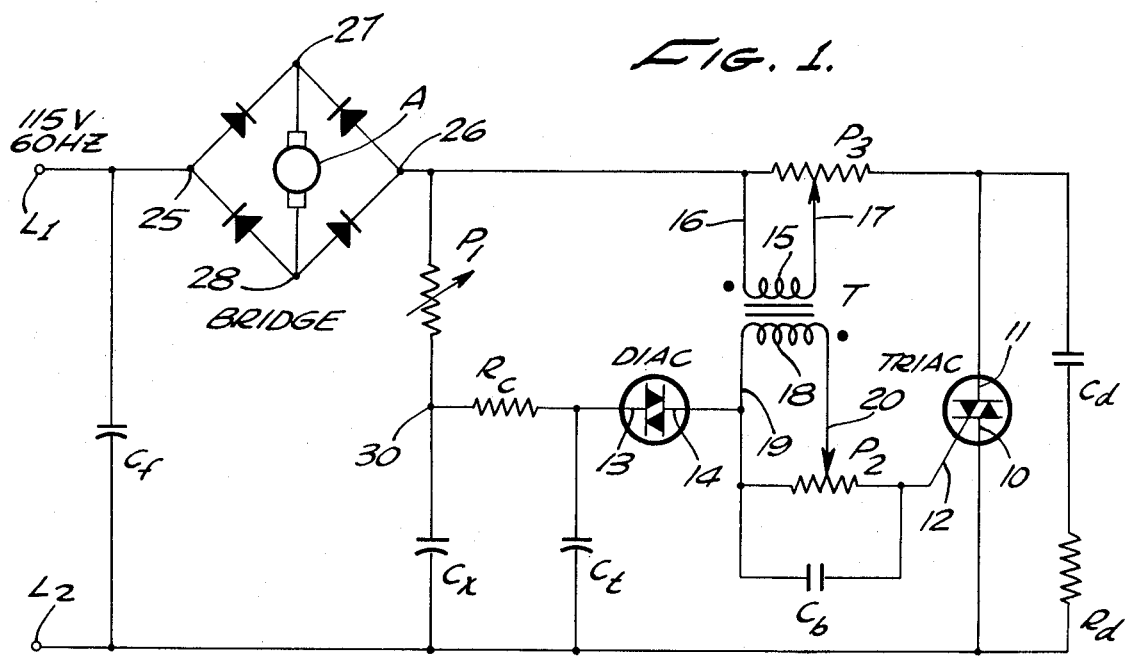
FIG. 1 is a schematic diagram of a Triac circuit incorporating a feedback transformer.

Reference is now made to FIG. 1 illustrating one form of Triac circuit provided in accordance with the present invention.

a TRIAC having power electrodes 10 and 11 and a gate terminal 12 is coupled in a series loop circuit with an alternating voltage source and a load. The alternating source is typically 115 Volts at 60 Hertz and is supplied on lines L1, L2. A bridge rectifier has input terminals 25, 26 which are connected in series in the line L1, and output terminals 27, 28 across which a motor armature is connected.

A diac having electrodes 13, 14 is used for triggering the Triac, and a timing capacitor $C_t$ connected between power electrode 10 of the Triac and electrode 13 of the diac is used for bringing the diac to its breakover voltage. A potentiometer P1 has one end connected to the rectifier terminal 26 and its other end connected to a junction 30. An auxiliary timing capacitor $C_x$ is connected between junction 30 and the line L2. A resistor $R_c$ is connected between junction 30 and electrode 13 of the diac.

A filter capacitor $C_f$ is connected between lines L1 and L2 and serves to filter spurious voltage pulses that may exist on the supply line. Another filter circuit connected in parallel with the Triac includes a capacitor $C_d$ and a resistor $R_d$ connected in series with each other, the series circuit being connected between power electrodes 10 and 11 of the Triac. This latter circuit is commonly known as the $dV/dt$ circuit and is used to prevent false triggering of the Triac.

The opposite half-cycles of the supply voltage are rectified by the bridge rectifier and all reach the motor armature in the same polarity sense; however, this rectification does not directly apply to the Triac and diac which receive a succession of positive and negative half waves of voltage. After the initiation of each new half-cycle of the supply voltage the timing capacitor $C_t$ charges up (with appropriate charge polarity) to the diac breakover voltage of approximately 35 Volts. Firing of the diac then initiates conduction of the Triac, which carries current for the remainder of that half-cycle. The rate of charging of capacitor $C_t$, and hence the precise firing time of the diac, are influenced by the value of resistor $R_c$ and auxilliary timing capacitor $C_x$, and also by the setting of the potentiometer P1. Potentiometer P1 is operated manually to select the voltage applied to the load, and hence the normal operating speed of the motor. When the present circuit is applied as a motor control, as now illustrated, the potentiometer P1 is known as the speed selection potentiometer.

The circuit of Figure 1 also includes a potentiometer P2 having its ends connected between electrode 14 of the diac and gate terminal 12 of the Triac. A potentiometer P3 has its ends connected between 26 of the bridge rectifier and power electrode 11 of the Triac. A step-up transformer T has a primary winding 15, of which one end 16 is connected to the bridge terminal 26 while the other end 17 is connected to the moveable tap of potentiometer P3. Transformer T also has a secondary winding 18, of which one end 19 is connected to diac electrode 14 while the other end 20 is connected to the moveable tap of potentiometer P2. A bypass capacitor $C_b$ is connected across the two ends of P2.

The purpose of transformer T is to respond to current flowing through the Triac, and hence through the primary winding 15, for generating a voltage which will influence the firing time of the diac. More specifically, when the flow of current through the main current path of the Triac between its power electrodes 10 and 11 becomes greater, the voltage signal generated by secondary winding 18 causes the firing point of the diac in the next succeeding half-cycle to advance to an earlier point.

Still more specifically, the firing of the diac is controlled by the charge on the timing capacitor $C_t$, but that charge is obtained from two separate and distinct sources. The charge on the timing capacitor is obtained mainly from the line voltage and tends to become charged up to the breakover level at a certain point of time in each half-cycle. When the diac fires the accumulated charge on the timing capacitor commences to discharge through a series loop path which includes the diac, bypass capacitor $C_b$, and through the gate terminal 12 and power electrode 10 of the Triac. This flow of current causes the Triac to become conductive almost immediately. Current flow through the main current path of the Triac then creates a voltage pulse on the transformer primary winding 15, resulting in a step-up pulse on the secondary winding 18. The voltage pulse on secondary winding 18 is applied across a portion of potentiometer P2, and is in such a direction as to hasten the discharge of the timing capacitor $C_t$. Therefore, in the immediately succeeding half-cycle, when the charge on timing capacitor $C_t$ assumes the opposite polarity, that charge will build up to the breakover level of the diac at an earlier point of time. Thus, a higher flow of current through the Triac in one particular half-cycle accelerates or advances the firing point of the Triac in the next succeeding half-cycle. Transformer T preferably has a step-up ratio of about 25 to 1, and is therefore able to provide a significant amount of regenerative feedback action.

It will, therefore, be seen that while timing capacitor $C_t$ is primarily charged through P1, Rc and Cx, the firing of the diac permits another voltage signal generated by secondary winding 18 to accelerate the discharge of capacitor $C_t$ and thereby advance the point at which it will reach the breakover voltage level of the diac in the next succeeding half-cycle.

Potentiometer P2 may be omitted altogether, but because of considerations of transformer design it is more desirable to utilize P2 as a shunt path and thereby decrease the amount of trigger current which must be routed through the secondary winding 18. A fixed resistor may also be substituted for potentiometer P2, but use of the potentiometer is a convenience for purpose of factory adjustment where the circuit is being made for use in conjunction with different sizes and types of motors. Thus, preferably the moveable tap of P2 is set at a particular location, in the factory, for optimum results of the circuit when used with a particular motor type and size. Bypass capacitor Cb permits the firing pulse from the diac to be transmitted immediately to the Triac, and without significant attenuation by the secondary winding 18 or potentiometer P2.

Potentiometer P3 may also be omitted from the circuit, but here again the considerations of transformer design make it desirable to route the greater part of the current through a resistor so that the current flowing through primary winding 15 will be diminished. For commercial production purposes a fixed resistor of suitable value is substituted for the potentiometer P3.

While the bridge rectifier and motor load are shown connected in line L1, it is also possible to connect them in line L2 with equivalent results. The load with which the circuit of FIG. 1 is utilized need not necessarily be a direct current motor, or even an electric motor of any kind, but may be any kind of other load as may be desired. It is true, however, that the regenerative feedback provides an increase in load voltage as load current increases, and that type of regenerative action is not needed in most applications of power supply circuits, other than motor controls.

In the circuit of FIG. 1 the bypass capacitor Cb is not strictly necessary since the firing signal can be passed through the parallel combination of potentiometer P2 and secondary winding 18. However, the inclusion of Cb is greatly desirably because it improves the reliability of the circuit operation, by giving the firing signal a much lower impedance path through which it may reach the gate terminal 12 of the Triac.

In the circuit of FIG. 1, when used as a motor speed control, it is preferred to provide an appropriately calibrated dial for use in conjunction with the speed potentiometer P1, the dial being calibrated throughout the desired motor speed range. It is possible to use approximately the same dial calibrations for different types and sizes of motors, simply by changing the setting of potentiometer P2 to an appropriate position corresponding to the feedback requirements of the particular motor.

The circuit of FIG. 1 has a significant limitation when used with certain direct current motors of the permanent magnet field type. This limitation is an intermittently erratic action at slow motor speeds. However, the erratic action at slow speeds is not experienced with most series motors or with wound field shunt motors.

Figure 2:
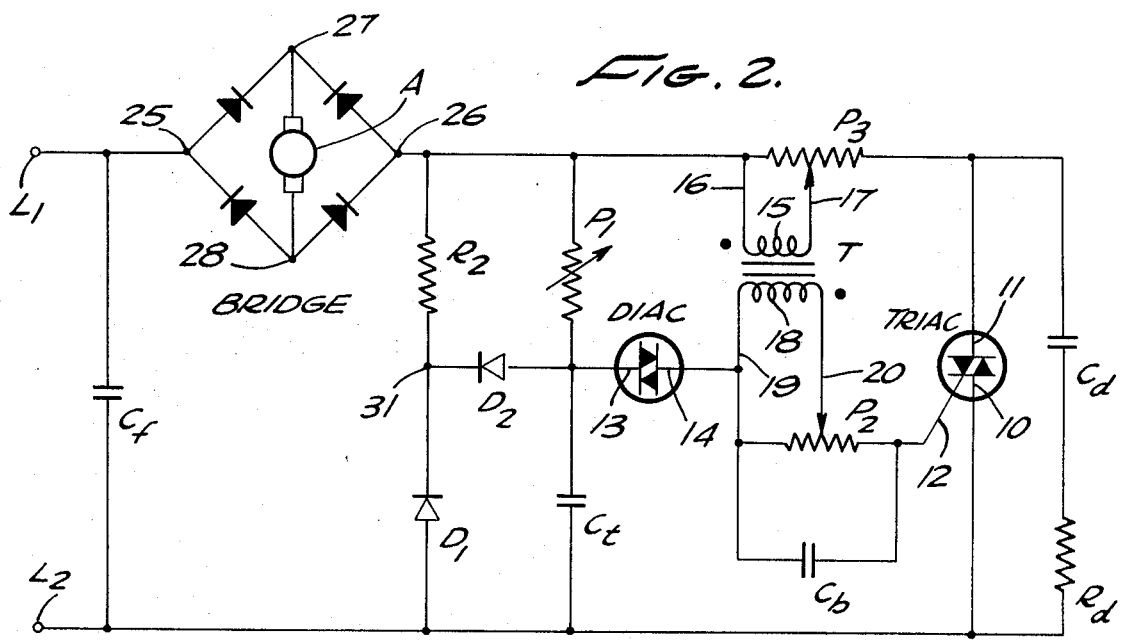
FIG. 2 is a schematic circuit diagram of another Triac circuit incorporating a feedback transformer.

Reference is now made to FIG. 2 of the drawings illustrating a second form of circuit in accordance with the present invention. Most of the circuit of FIG. 2 is the same as the circuit of FIG. 1, and like parts are identified by like reference characters. The different feature of the circuit of Feature 2 is the charging circuit for charging the timing capacitor $C_t$.

Thus, in FIG. 2 a resistor R2 is connected between bridge terminal 26 and a junction point 31. A first semi-conductor diode D1 has its cathode connected to junction point 31 and its anode connected to line L2. The speed control potentiometer P1 has one end connected to bridge terminal 26 while its other end is connected to electrode 13 of the diac. Timing capacitor $C_t$, as before, is connected between diac electrode 13 and Triac electrode 10. A second semi-conductor diode D2 has its cathode connected to junction point 31 and its anode connected to the diac electrode 13.

The charging circuit of FIG. 2 operates to reset the timing capacitor Ct at the end of each positive half-cycle of the supply voltage. During the positive half-cycle both diodes are reverse-biased and capacitor $C_t$ charges through P1 to a positive voltage. If the voltage level to which capacitor $C_t$ is charged is just short of the switching or triggering voltage of the diac, then the diac will not switch, but when the positive supply voltage subsequently becomes less than the potential stored on the capacitor the capacitor then discharges through diode D2 and resistor R2. After the line voltage crosses zero and becomes negative, diode D1 conducts and the capacitor charges to a negative voltage. No resetting is obtained at the end of the negative half-cycle. However, the snapon effect is reduced to an insignificant level by this circuit, and full load power is achieved.

The circuit of FIG. 2, when used with a permanent magnet motor as the load, does have the capability of providing a desired operating speed in the low end of the speed range. Transformer T also provides the regenerative feedback voltage which is needed to maintain motor speed constant. However, in the experimental results thus far obtained with the circuit of FIG. 2 it has not provided as desirable an overall operational characteristic as the circuit of FIG. 3, soon to be described.

Figure 3:
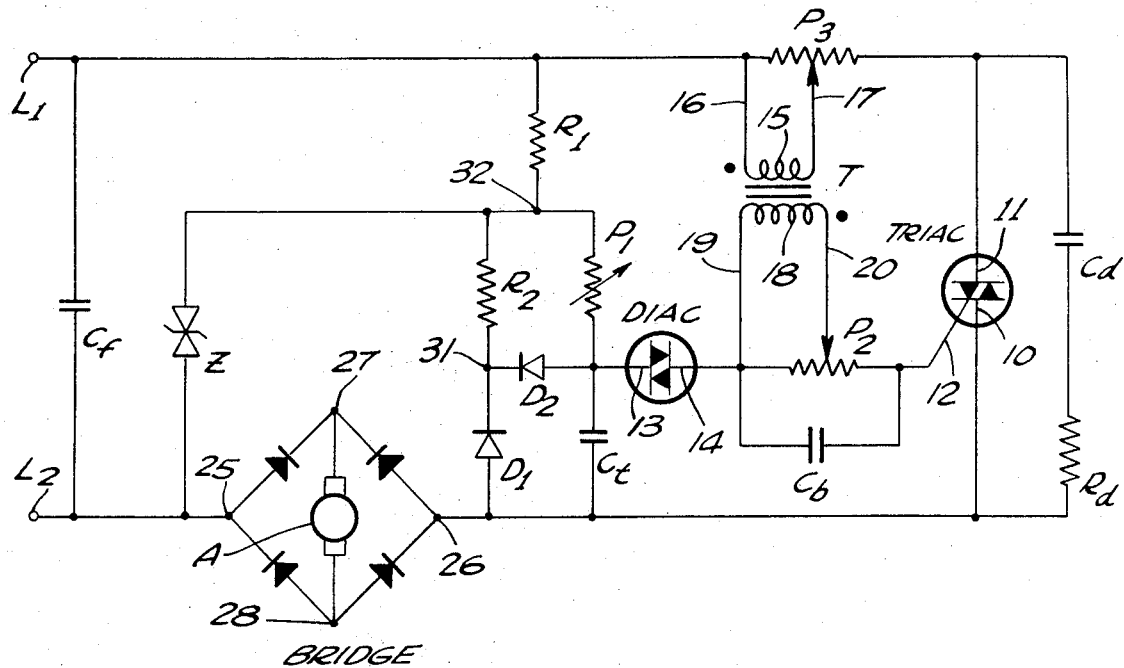
FIG. 3 is the presently preferred form of Triac circuit utilizing a feedback transformer.

Reference is now made to FIG. 3 of the drawings illustrating one presently preferred form of Triac control circuit in accordance with the present invention. The diac, Triac, and transformer portions of the circuit are the same as in FIGS. 1 and 2. There are significant changes, however, in the use of Zener diodes for line voltage regulation, in the location of the motor load, and in a modification of the charging circuit for capacitor $C_t$.

More specifically, in the circuit of FIG. 3 a resistor R1 is connected to line L1, the other end of R1 being connected to a junction point 32. Potentiometer P1 and resistor R2 are connected to the junction point 32 rather than being connected directly to the line L1. The remaining connections of diodes D1 and D2, and capacitor $C_t$, are the same as in FIG. 2.

FIG. 3 also includes a pair of back-to-back Zener diodes Z which are connected between the junction point 32 and the supply line L2, on the voltage source side of the supply line. The bridge rectifier circuit is connected in series in Line L2, with input terminal 25 being connected to one side of the Zener diodes and input terminal 26 being connected to the anode of diode D1, one end of capacitor $C_t$, and power electrode 10 of the Triac. Connection of the motor armature across output terminals 27, 28 of the bridge is the same as before.

In the circuit of FIG. 3 the function of the Zener diodes Z is to make the motor speed substantially independent of fluctuations in the supply line voltage. Any fluctuations which do take place in the supply line voltage are taken up across the resistor R1, and the voltage drop across the Zener diodes Z remains constant. The particular location of the load as shown is necessary in order to achieve the benefit of the Zener diodes.

While the circuit of FIG. 3 illustrates an electric motor as the load, and more specifically, a direct current motor for which the current is rectified by a bridge rectifier, it is also possible to use the circuit of FIG. 3 with other types of loads, both AC and DC. The location of the load is, however, preferably as shown, in order to achieve the benefit of supply line voltage regulation.

In the circuit of FIG. 3 the value of resistor R1 may typically be 5,000 ohms while the value of resistor R2 may typically be 15,000 ohms. The use of these two separate resistors, and their interconnection in the manner shown with speed potentiometer P1, has a distinct advantage in smoothing the regenerative feedback characteristic of the circuit. More specifically, the mechanical loading of the motor causes feedback action to commence immediately rather than after some delay as is experienced with the circuit of FIG. 2.

Thus, the circuit of FIG. 3 provides superior operating characteristics in that it provides compensation for fluctuation in supply line voltage, and it also provides a more immediate and smoother characteristic in the regenerative feedback action of the circuit when mechanical loading of the motor is increased.

The circuit of FIG. 3, may if desired, be modified by omitting the Zener diodes. Of course, the compensation for supply line voltage fluctuations is then not obtained.

Figure 4:
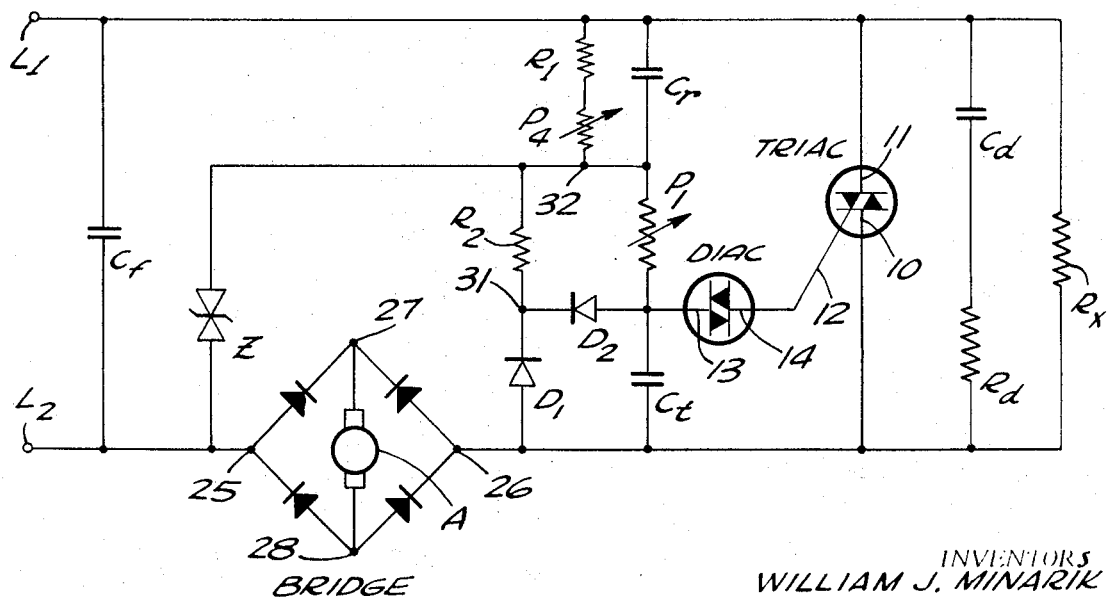
FIG. 4 is another presently preferred form of Triac circuit in which regenerative feedback is accomplished without a transformer.

Reference is now made to FIG. 4 of the drawings illustrating another preferred form of circuit according to the present invention.

In the circuit of FIG. 4 the transformer T is not included, and terminal 14 of the diac is connected directly to gate terminal 12 of the Triac. The circuit preceding the diac is similar to that of FIG. 3. However, a potentiometer P4 is connected in series with resistor R1 between L1 and junction 32, and a regenerative capacitor Cr is also connected between L1 and junction 32. For a small motor load the maximum value of P4 may be 5,000 ohms and the value of Cr may be 0.1 microfarad. From the standpoint of circuit operation R1 and P4 together constitute a "first resistor" with R1 being the fixed portion and P4 the variable portion. For a particular motor load P4 is set to a particular value which is optimum. Cr provides additional feedback over and above what is provided by R1 and P4.

The circuit of FIG. 4 also includes an additional resistor Rx which is connected in parallel with the Triac, between electrodes 10 and 11. A typical value for Rx may be 5,000 ohms.

It has been found experimentally that the circuit of FIG. 4 provides regenerative feedback voltage in response to an increase in the mechanical loading of the motor. The reasons for this regenerative feedback action are not clearly understood at the present time. The resistor Rx adds to the regenerative action, and gives the circuit somewhat more stability at light loads, but may be omitted. The Zener diodes Z may also be omitted, in which event R1 may be omitted, and again the circuit operation is satisfactory, but the regenerative action is somewhat diminished and no line voltage compensation is experienced. The preferred form of the circuit is as shown.

While in the circuits herein disclosed a diac has been utilized for triggering the triac, such triggering may also be achieved by another type of triggering device such as a neon bulb or a silicon bilateral switch.

What is claimed is:

1. A triac voltage control circuit comprising:
a triac;
a triggering device;
a timing capacitor coupled between one terminal of said triggering device and one power electrode of said triac;
a transformer having a primary winding coupled to the other power electrode of said triac, and a secondary winding coupled between the other terminal of said triggering device and the gate terminal of said triac;
a voltage source coupled in a series loop with said primary winding and the main current path of said triac;
and means for charging said capacitor so as to raise the voltage across said triggering device to its breakover level;
the polarity of said secondary winding being such that after the triggering device fires and said capacitor commences to discharge through the gate terminal of said triac, the initiation of current flow through the main current path of said triac and said primary winding induces a voltage in said secondary winding in such a direction as to accelerate the discharge of said capacitor.

2. The circuit of claim 1 wherein said transformer is a step-up transformer.

3. The circuit of claim 1 which further includes a resistor connected in parallel with said secondary winding.

4. The circuit of claim 3 which further includes a by-pass capacitor coupled in parallel with said resistor.

5. The circuit of claim 1 wherein said transformer is a step-up transformer; and which further includes a resistor and a bypass capacitor both of which are coupled in parallel with said secondary winding.

6. The circuit of claim 5 wherein said resistor is a potentiometer connected between said other terminal of said triggering device and the gate terminal of said triac, said bypass capacitor being connected between the two ends of said potentiometer, and said secondary winding being connected between one end and the movable top of said potentiometer.

7. The circuit of claim 1 which further includes a resistor connected in parallel with said primary winding.

8. The circuit of claim 1 wherein said primary winding is directly connected to said other power electrode of said triac, and which further includes a load coupled in said series loop between said voltage source and the series combination of said primary winding and said triac.

9. The circuit of claim 8 wherein said charging means includes a potentiometer having one of its ends connected to the juncture of said timing capacitor and said one terminal of said triggering device.

10. The circuit of claim 8 wherein said load is connected between said voltage source and said one power electrode of said triac.

11. A triac motor speed control circuit comprising;
a triac;
a triggering device;
a timing capacitor connected between one terminal of said triggering device and one power electrode of said triac;
a transformer having a primary winding of which one end is coupled to the other power electrode of said triac, and a secondary winding couple between the other terminal of said triggering device and the gate terminal of said triac;
an alternating voltage source coupled to the other end of said primary winding;
means for coupling the motor between said voltage source and said one power electrode of said triac;
a first resistor, a second resistor, and a first diode connected in a series circuit, the remote end of said first resistor being connected to said other end of said primary winding and the remote end of said first diode being connected to said one power electrode of said triac;
a speed potentiometer connected between the juncture of said first and second resistors and said one terminal of said triggering device;
and a second diode connected to the juncture of said second resistor and first diode, in opposite polarity to said first diode, its remote end being connected to the juncture of said potentiometer and timing capacitor;
the polarity of said secondary winding being such that after the triggering device fires and said capacitor commences to discharge through the gate terminal of said triac, the initiation of current flow through the main current path of said triac and said primary winding induces a voltage in said secondary winding in such a direction as to accelerate the discharge of said capacitor.

12. A motor speed control circuit as claimed in claim 11 which further includes a back-to-back pair of Zener diodes connected to the juncture of said first and second resistors and forming a series loop with said first resistor and said voltage source, the motor being coupled between the remote end of said first diode and the other terminal of said Zener diodes.

13. A motor speed control circuit as claimed in claim 11 wherein said transformer is a step-up transformer; and which further includes a resistor and a bypass capacitor both of which are coupled in parallel with said secondary winding.

14. A motor speed control circuit as claimed in claim 13 wherein said resistor is a potentiometer connected between said other terminal of said triggering device and the gate terminal of said triac, said bypass capacitor being connected between the two ends of said potentiometer, and said secondary winding being connected between one end and the movable tap of said potentiometer.

15. A motor speed control circuit as claimed in claim 13 which further includes a back-to-back pair of Zener diodes connected to the juncture of said first and second resistors and forming a series loop with said first resistor and said voltage source, the motor being coupled between the remote end of said first diode and the other terminal of said Zener diodes.

16. A motor speed control circuit as claimed in claim 15 wherein said resistor is a potentiometer connected between said other terminal of said triggering device and the gate terminal of said triac, said bypass capacitor being connected between the two ends of said potentiometer, and said secondary winding being connected between one end and the movable tap of said potentiometer.

17. In a motor speed control circuit, the combination comprising:
   a transformer having a primary winding coupled in a series loop with the motor and with a source of full-wave alternating voltage;
   a triac coupled into said series loop circuit to control current flow through the motor;
   a diac coupled to said triac for triggering same;
   and means for triggering the diac, including a timing capacitor, and a secondary winding of said transformer coupled between said diac and said triac and operable in response to current flowing through said primary winding to selectively add to or subtract from the voltage developed across said timing capacitor.

* * * * *